United States Patent [19]
Weathers et al.

[11] 3,956,589
[45] May 11, 1976

[54] DATA TELECOMMUNICATION SYSTEM

[75] Inventors: Luther V. Weathers; Thomas V. Saliga; Joseph M. Looney; Harvey H. Harris; Cletus L. Gardenhour, all of Clearwater, Fla.

[73] Assignee: Paradyne Corporation, Largo, Fla.

[22] Filed: Sept. 24, 1974

[21] Appl. No.: 508,898

Related U.S. Application Data

[63] Continuation-in-part of Ser. No. 419,142, Nov. 26, 1973, which is a continuation of Ser. No. 202,480, Nov. 26, 1971, abandoned.

[52] U.S. Cl. .................. 178/58 A; 340/146.1 BA
[51] Int. Cl.² .................................. H04L 1/10
[58] Field of Search ............ 179/15 R; 178/58 R, 178/58 A; 340/146.1 BA

[56] References Cited
UNITED STATES PATENTS

| | | | |
|---|---|---|---|
| 3,388,378 | 6/1968 | Steenech et al. | 340/146.1 BA |
| 3,491,207 | 1/1970 | Birck | 179/15 FD |
| 3,641,494 | 2/1972 | Perrault et al. | 340/146.1 BA |
| 3,655,915 | 4/1972 | Liberman | 179/175.1 R |
| 3,659,046 | 4/1972 | Angelien | 178/22 |
| 3,660,761 | 5/1972 | Harman et al. | 333/18 |
| R27,864 | 1/1974 | Davis et al. | 178/58 R |

Primary Examiner—Kathleen H. Claffy
Assistant Examiner—E. Matt Kemeny
Attorney, Agent, or Firm—Stein, Orman & Pettis

[57] ABSTRACT

An error-free, data telecommunication system designed for continuous high speed error-free data communications over dial-up voice grade circuits comprising a high speed data transmission section including internal data buffering and a low speed reverse channel ARQ (automatic request for repeat) receiver and a high speed data receiving section including a low speed reverse channel ARQ transmitter whereby high speed data and reverse ARQ signaling are transmitted simultaneously over a two wire dial-up network. The system is capable of half-duplex, two wire operation and full-duplex, four wire operation.

8 Claims, 9 Drawing Figures

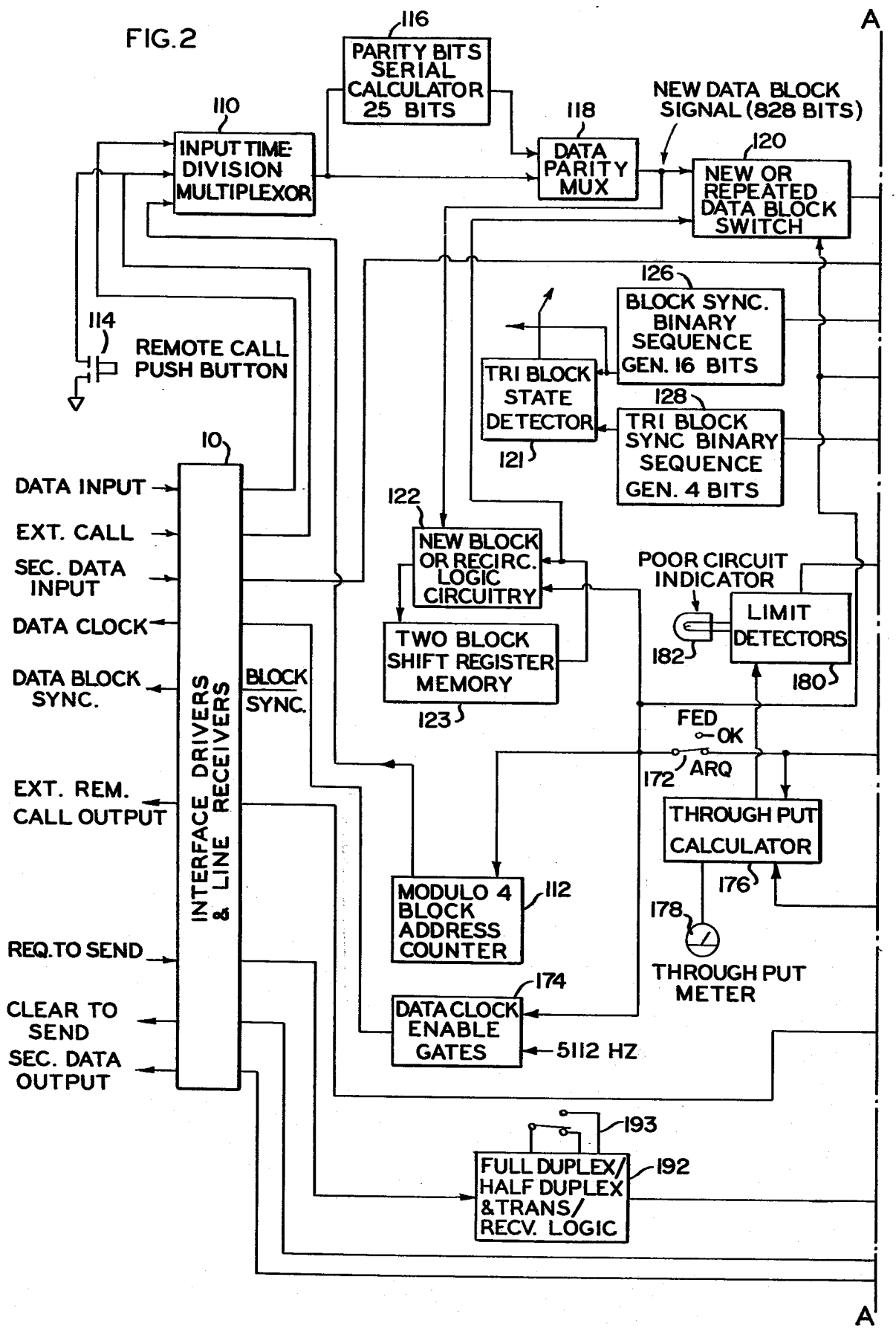

DATA TELECOMMUNICATION SYSTEM

This application is a continuation-in-part application of serial number, 419,142 filed Nov. 26, 1973 which was a continuation application of serial number 202,480, filed Nov. 26, 1971 and now abandoned.

BACKGROUND OF THE INVENTION

1. Field of the Invention

An error-free data telecommunication system for continuous high speed error-free data communications including ARQ signaling, internal data buffering and automatic retransmission.

2. Description of the Prior Art

Existing data communications systems which require an immediate transfer of data between a computer and another distant computer or I/O device, normally use voice-grade telephone lines as the transmission medium between the two locations. Systems that have only a small number of I/O locations and a need for nearly 24 hours per day data transfer commonly employ special dedicated or "private" lines between locations. These lines are leased from common carriers and are often engineered to meet special data signaling requirements.

However, there is a large class of phone-line date transmission users (hereinafter referred to as telecommunications users) which need the switching flexibility of the dial-up telephone network for telecommunications. It is these users which are especially hampered by serious inefficiencies in existing systems, and for which the described invention provides as effective solution.

To successfully transfer data signals over the bandwidth limited phone network, special signal modifying equipment, called modems, are required. These modems accept the DC pulse output from a computer or terminal equipment and convert this pulse to an audio signal suitable for transmission over voice grade lines or similar facilities. These signals are reconverted to their original pulse state at the receiving end for use by the terminal equipment. Because of a continuing need for ever higher data transfer speed, the modem speed capability has been engineered to almost its maximum theoretical limit.

As the transmission speeds are increased, error rates become a source of concern. In recent tests a modem was demonstrated at 4,800 bits per second which has a detected error rate of only about six bits in $10^7$. However, three or four dial-up calls had to be made before a circuit could be found that could be equalized sufficiently to permit transmission. In general it appears that most high speed modems have error rates of about one in $10^5$ on the average dial-up phone connection and often is poorer. Error rates of this magnitude are still far too large to be acceptable for computer requirements. Thus all high-speed telecommunication systems must, in addition to the modems, incorporate some error control system.

Ordinarily, modems provide no error control hardware features. So the data processing equipment must provide its own error protection. The most common existing technique is the IBM BSC (Binary Synchronous Communication procedure). In the IBM BSC technique a "Stop-and-Wait" request for repeat (ARQ) system is employed. The time-serial data bits from the computer are partitioned into blocks and various additional bits are added for synchronization and parity error checking purposes. The error control sequence for BSC is as follows: after Block A has been sent, the sending transmitter stops and waits for an acknowledgment. At the receiving end Block A is checked for errors and an acknowledge (ACK) or a negative acknowledge (NAK) message is sent to indicate whether the block was received correctly or not. The sending transmitter cannot transmit Block B until it receives confirmation that Block A has been received correctly.

The main difficulty with the BSC method is that turn-around from send to receive and vice versa is not instantaneous but takes about 150 milliseconds each, or 300 milliseconds total. To this turn-around time is added the round-trip transport delay and the ACK/NAK transmission time for a total waiting time of about 310 to 370 milliseconds at the end of each block. This waiting time is deadtime whether there are errors or not; i.e., for every block transmitted roughly a third of a second is wasted.

It is this deadtime which accounts for the poor throughput. (Throughput is defined here as the total number of error-free data blocks transferred, divided by the total number of blocks transferred. Ref. 1 - Barney Reiffen, William G. Schmidth, Howard Yidkin, "The Design of an Error-Free Data Transmission System for Telephone Circuits," *Communications and Electronics*, July, 1961 and Ref. 2 - H. C. A. Van Duuren, "Error Probability and Transmission Speed on Circuits Using Error Detection and Automatic Repetition of Signals," *I. R. E. Transactions on Communications Systems*, March, 1961) of "Stop-and-Wait" ARQ systems on the dial-network even in the absence of transmission errors. unless it is eliminated, effective throughput is limited to a maximum of about three blocks per second regardless of block-length or modem speed. In contrast, a "Continuous" ARQ system as described in the invention, can increase effective throughput in direct proportion to increases in the rated speed of the modem. Continuous ARQ techniques are not new (Refs. 1 and 2) but the described invention differs from these in a variety of ways.

Since the handling of telecommunication data errors in existing systems is left in the computer users hands, a number of unfortunate operational and environmental restrictions impact the user. Namely:

Reduction in data throughput due to overhead loss needed for special communications characters.

Reduction in data throughput due to lost transmission time caused by the "Stop-and-Wait" error-control procedures.

Reduction in data throughput due to excessive retransmission of data records caused by nonoptimum record lengths for the telecommunications environment.

Loss of computer core storage space dedicated to communications software.

Reduction in system throughput due to heavy disk memory access demands caused by short block lengths and frequent calling of error recovery routines.

Loss of CPU capacity dedicated to the management of special communication functions, error control procedures, and retransmission overhead.

In addition to the foregoing inefficiencies introduced into the system in a measurable way, conventional data communications methodology also impacts the user with some indirect but nevertheless real costs. Because of the communication support packages such as IBM'S BTAM software package (Basic Telecommunication Access Method), the user must concern himself with a new and extensive set of systems analysis and software concepts. In other words, a computer user must learn a different set of software conventions when utilizing I/O devices in a communication mode. In addition, he must also dedicate additional computer facilities to the expanded operating system needed to support these new communication procedures.

Thus, it is apparent that a real need exists for an error-free high-speed, high-throughput, telecommunication system for dial-up and private lines which can relieve the computer user of all of the previously mentioned inefficiencies and softward complexities — provided this system can easily interface with the computer system and be reasonably priced.

SUMMARY OF THE INVENTION

The present invention relates to an error-free, data telecommunication system (DTS) comprising a high speed data transmission section and a high speed data receiving section having a half-duplex/full-duplex configuration and automatic request for repeat/forward error detection (ARQ/FED) mode.

The high speed data transmission section comprising ARQ logic circuitry, storage buffer, encoder, multiplexor, high speed data transmitter (HST), and low speed reverse channel ARQ receiver (LSR). The high speed data receiving section comprises a high speed data receiver (HSR), ARQ logic circuitry, storage buffer, demulti-plexor, decoder and a low speed reverse channel ARQ transmitter (LST). The HST/LSR and HSR/LST combinations are coupled through a transmit/receive relay and terminal means to data transmission lines. Control and data interface, timing, and power supply subsystems are common to both the high speed data transmission section and the high speed data receiving section.

A unique feature of the data telecommunications system is the low speed reverse channel comprising the LST and LSR which operate simultaneously with the high speed forward data channel comprising the HST and HSR. This reverse channel permits the efficient operation of an ARQ error control algorithm.

To avoid severe lines distortion considered unsatisfactory for high speed data transmission a fixed bit sequence at the beginning of transmission enables a digital adaptive equalizer to automatically train the circuits. The effect of the equalizer is to widen the usable bandwidth of the circuits and consequently to permit a higher signaling rate.

In operation, high speed data is clocked from the data terminal equipment to the high speed data transmission section where additional overhead bits for error detection and system control are appended to each data block and buffered. Additional secondary channel data and synchronization bits are added and fed to a pulse amplitude modulation (PAM) encoder which encodes the serial binary data, two bits at a time, to produce a four-level pulse amplitude modulated signal. This signal is modulated by the HST and transmitted to a remote DTS where it is demodulated and checked for tansmission errors.

In the ARQ mode, if the received data is error-free it is clocked to the user and an ACK message is generated by the LST and returned to the transmitting system via the low speed reverse channel. However, if an error is detected by the OR/RQ logic, a NAK message generated by the LST requests retransmission of the previous two blocks buffered in the high speed data transmission section rather than new data. It is important to note that the high speed data transmission section must receive a positive ACK message from the remote DTS before new data is clocked from the data terminal equipment. These ACK/NAK messages, sent via the low speed reverse channel, are frequency division multiplexed below the high speed forward data channel. The low speed channel uses differential phase-shift keyed (DPSK) modulation and error detection codes similar to the forward channel. Secondary data is time division multiplexed with the ACK/NAK messages. This in combination with the low speed forward secondary channel comprises a low speed secondary channel that provides full-duplex two-way communication interruption of data flow when in half duplex configuration. On a four-wire system in the full-duplex configuration, two 24 bps full duplex secondary channels are available. Because the ACK/NAK messages are transmitted simultaneously with newly received data on the forward channel, there is no interruption of data flow unless an error is received, in which case the buffered data is repeated.

When operated in the forward-error detect (FED) mode all data received is clocked to the user notwithstanding the ARQ signaling.

There are a number of additional features such as built-in throughput calculators which calculate the average percentage of data blocks delivered error-free to the remote DTS. Visual indication of throughput performance is also provided through various meters and lamps.

In addition, a remote-call feature allows the operator at either end to signal the operator at the other end without interferring with data flow. When the operator at the other end responds and switches to the voice mode, data flow is interrupted, but there is no loss of data when data transmission is resumed since high speed data is buffered by the transmitting DTS until acknowledged by the receiving DTS.

A self-test feature, local loop-back, places a simulated telephone line between the local HST and HSR. Forced bit-error insertion to check for proper ARQ operation is provided by the synthetic error and delay test logic.

On four wire transmission circuit, both the local and remote system may transmit and receive high speed data simultaneously.

Since the DTS is for all practical purposes error-free, has block synchronization and requires a positive request to receive signal from the receiving DTS, it is possible to incorporate a parallel interface extender (PIX) as an alternative embodiment whereby data control information may be transferred between the data terminal equipment and the DTS across parallel channels. Data is taken from a local DTE across the interface in parallel channels are serially converted by the PIX for transmission over the high speed transmission section. At the terminal end of the communications path the high speed receiving section processes the incoming data serially and transfers it to the PIX where the data is converted for delivery to data terminal equipment across a similar parallel interface. Thus, the transmitting DTS/PIX appears to the remote terminal as an extension of a standard parallel I/O channel. To transfer information across the interface, it is only necessary to determine the operation as read or write, whether the information is data or control, and the beginning and end of each data character. Since the PIX interface is a true ready/resume interface, there is no synchronization requirement, no block length restrictions, and no internal timeout. As long as the PIX is enabled by the associated processing equipment it will wait for and accept data when available. Thus, the use of the PIX in combination with the basic DTS provides a new dimension in telecommunication to remote I/O devices and computers.

Because of the efficient ARQ procedures, this system provides better performance on the dial-up network than is now obtainable on most private-line installations. Since dial-up service offers many advantages over private line service such as greater availability, greater use of remote terminals to time-share and wider accessability by offering computer center services to more terminal users, the application of this system to today's requirements is virtually unlimited. However, when desired, this system functions equally well on private-lines; retaining the advantages of no communication software requirements.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIGS. 2, 2A and 2B show a block diagram of the high speed data transmission section.

Similar reference characters refer to similar parts throughout the several views of the drawings.

DETAILED DESCRIPTION OF THE PREFERRED EMBODIMENT

Figure 1:
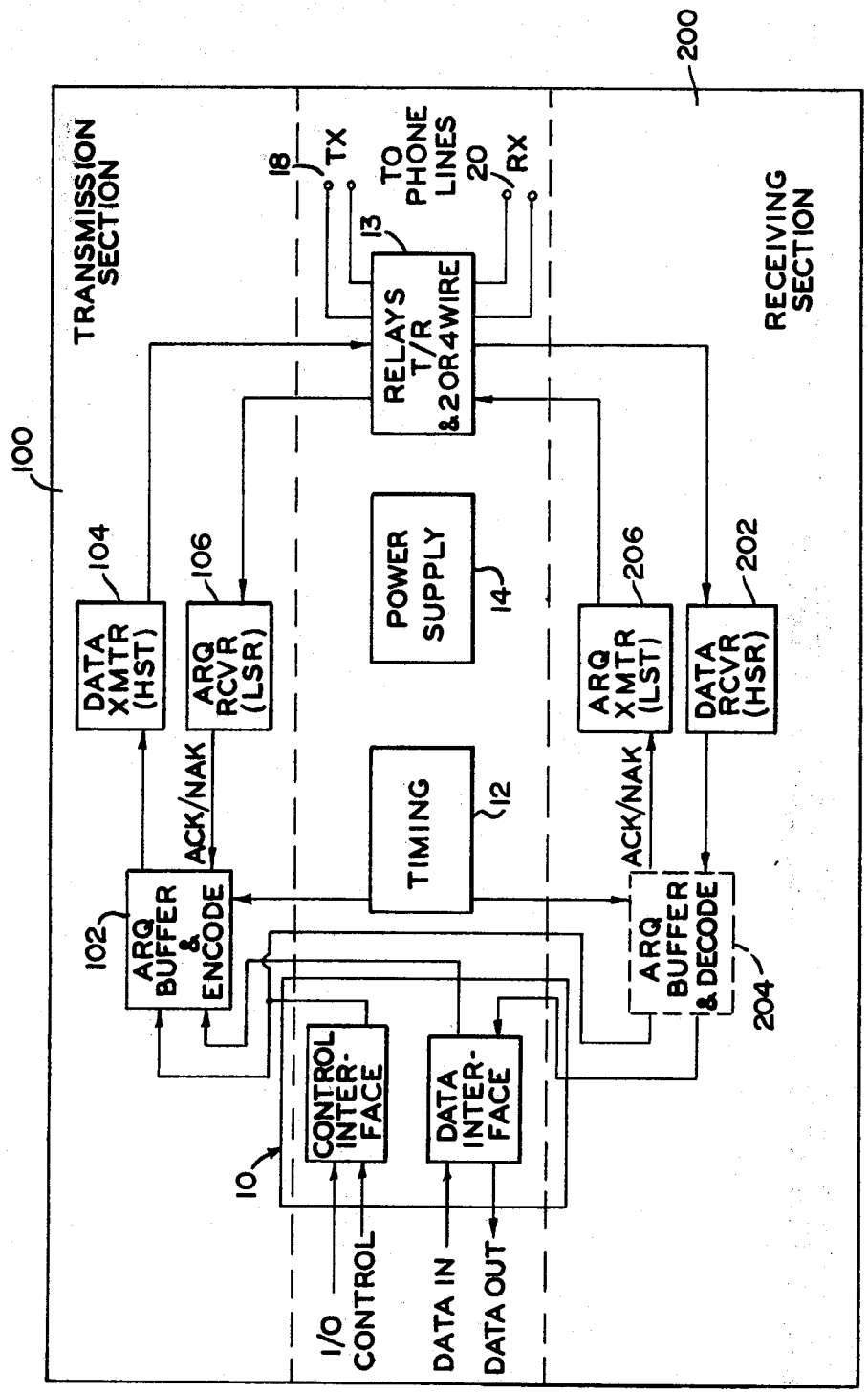
FIG. 1 is a block diagram of the data telecommunication system.

As shown in FIG. 1, the data telecommunication system (DTS) comprises a high speed data transmission section 100 indicated in the upper portion of the figures and a high speed data receiving section 200 indicated in the lower portion of the figures. The control and data interface 10, timing 12 and power supply 14 subsystems are common to both the transmission section 100 and the receiving section 200. Interface 10 may comprise an EIA RS-232 interface or similar means to regulate the various voltage levels to provide compatability between the sub-systems.

The high speed data transmission section 100 includes ARQ logic circuitry, storage buffer, multiplexor and encoder 102 which computes parity bits, multiplexes data from interface 10 with error detection and control overhead bits, stores data in a two block buffer and encodes the signal in pulse amplitude modulation. The encoded, multiplexed data are fed to a high speed data transmitter (HST) 104 where it is modulated, vestigal-sideband filtered, and fed to transmit/receive (T/R) relay 13 for transmission.

Incoming ACK/NAK signals from a receiving remote DTS are routed through T/R relay 13 to the low speed reverse channel receiver (LSR) 106 where the signals are demodulated and decoded and fed to ARQ logic circuitry 102.

The high speed data receiving section 200 includes a high speed data receiver (HSR) 202 which demodulates incoming high speed data received from a remote DTS through T/R relay 13. The demodulated signal is fed to ARQ logic circuitry, storage buffer and decoder 204 where it is decoded, demultiplexed, and checked for parity.

ARQ logic circuitry 204 generates an ACK/NAK signal which is delivered to low speed reverse channel transmitter LST 206 where it is multiplexed and encoded for transmission via the low speed reverse channel to a remote transmitting DTS via T/R relay 13.

The HST 104 signal is transmitted from T/R relay 13 to transmission lines via first terminal means 18. Incoming high speed data is routed through first terminal means 18 in the half-duplex configuration or through second terminal means 20 in the full-duplex configuration.

Figure 2A:
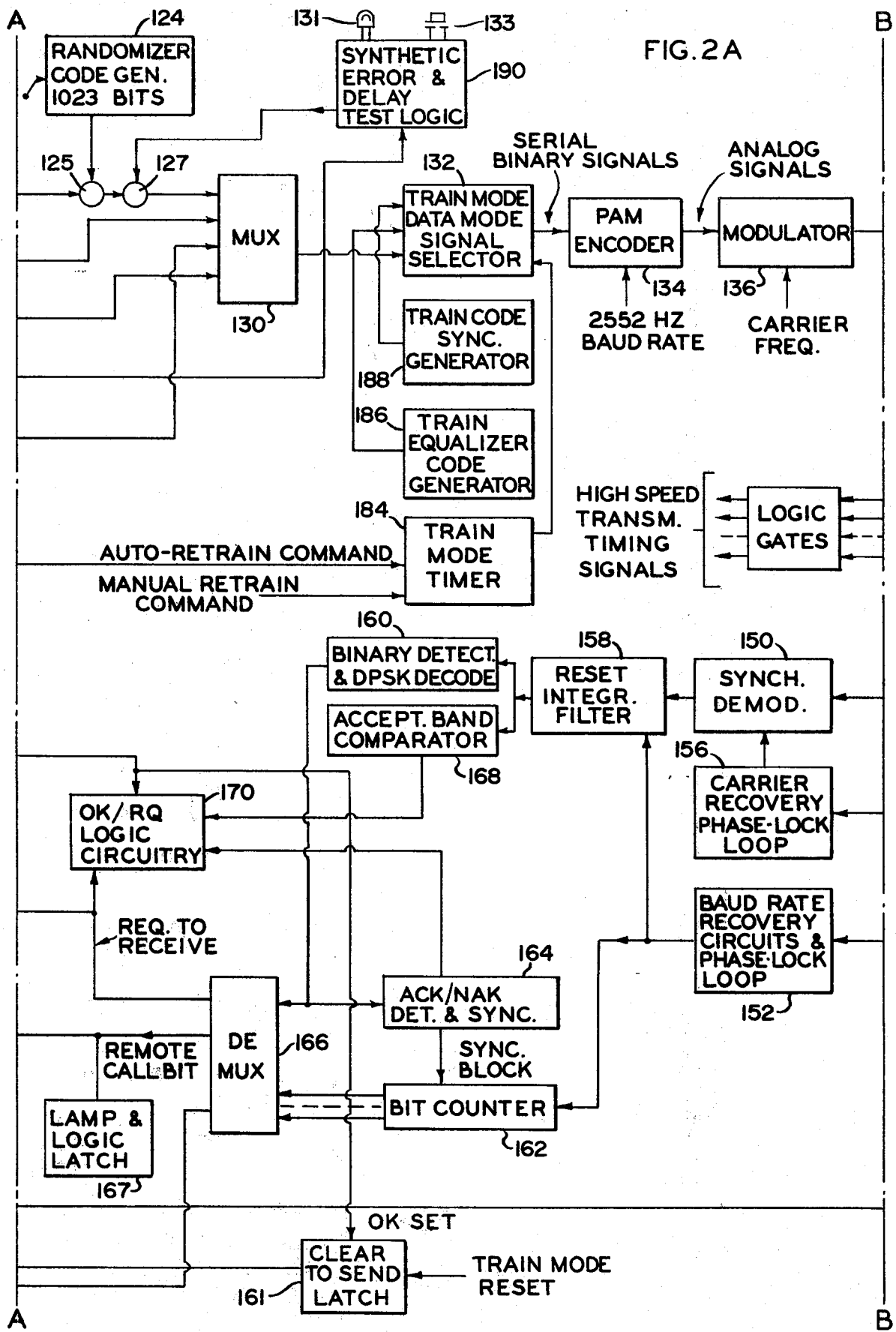
Figure 2B:
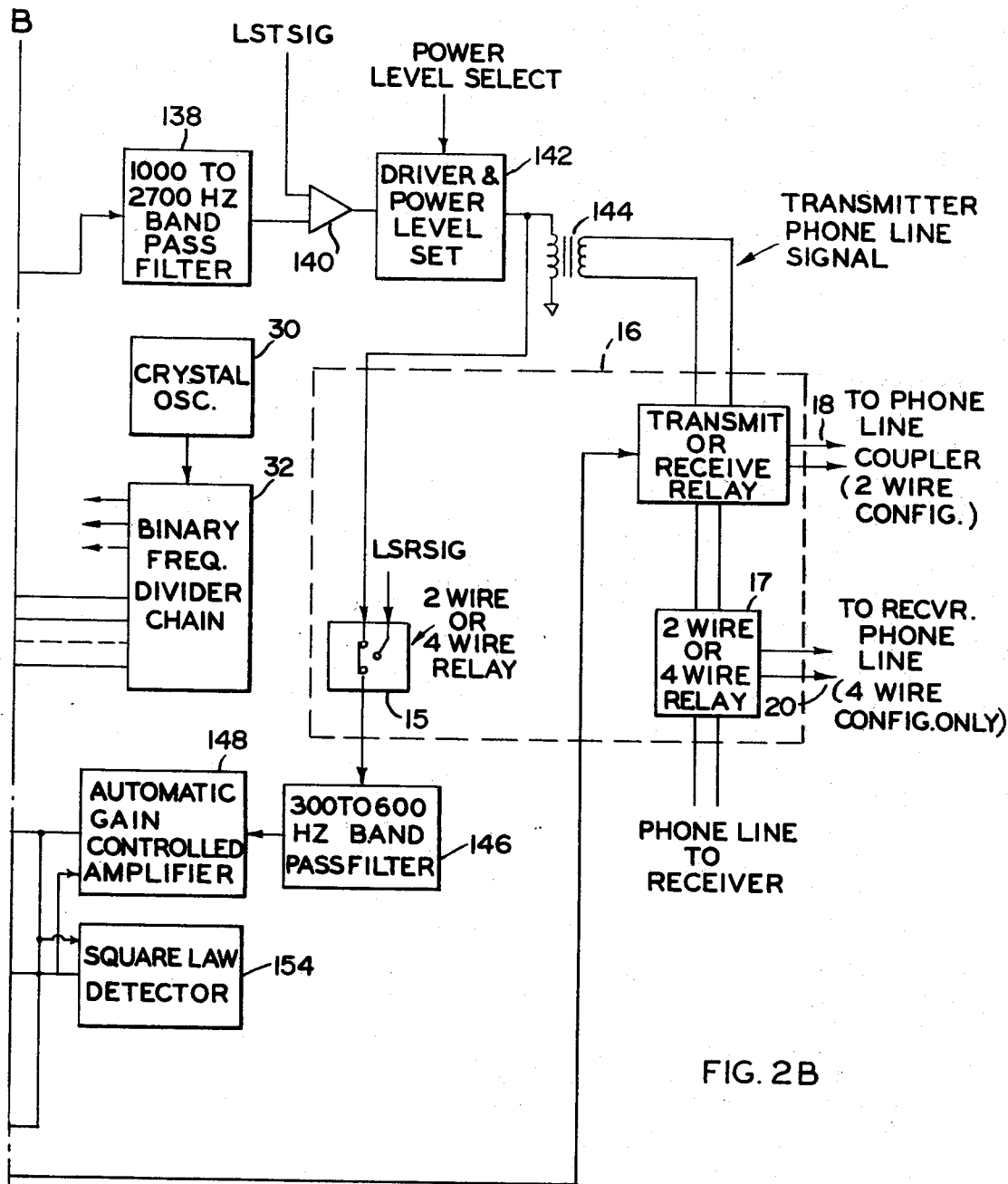
Figure 6:
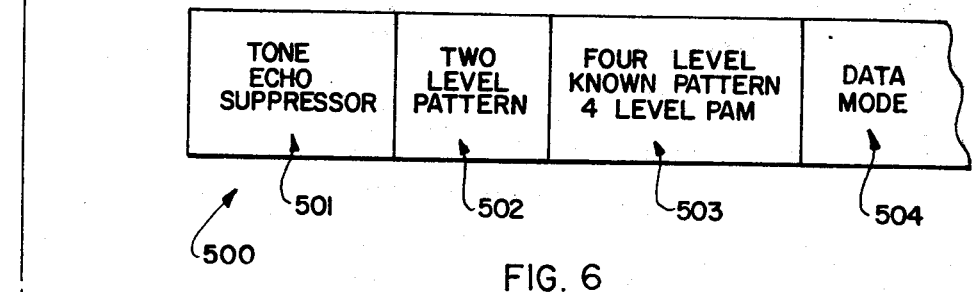
FIG. 6 is a diagram of the training code.

FIG. 2 shows in detail the high speed data transmission section 100. High speed input data is clocked from data terminal equipment (not shown) in blocks or 800 bits via interface drivers and line receivers 10 to input time — division multiplexor 110 where it is multiplexed with a 2 bit block address from modulo 4 block address counter 112 and a 1 bit remote call signal generated from either remote call push button 114 or external "call" through interface 10. The multiplexed signal is fed simultaneously to parity pit, serial calculator 116 where a 25 bit parity code is calculated and to data/-parity bit multiplexor 118. Multiplexor 118 multiplexes the data and parity bits to form a "new" data block signal of 828 error protected bits. This signal is fed simultaneously to "new" or repeat data block switch 120 and to "new" block or recirculate logic circuitry 122. Data block switch 120 comprises a simple select switch to alternately control the output therefrom as new data or repeat data. similarly, logic circuitry 122 comprises a select switch to alternately receive new or recirculated data in response to the ACK/NAK messages. The output of switch 120, whether "new" or repeated data, is combined with the output of randomizer code generator 124 by mod 2 adder 125 and fed through mod 2 adder 127 used for self-test purposes (described hereinafter) to multi-plexor 130. Multiplexor 130 multiplexes the encoded data with a 16 bit block sync from block sync binary sequence generator 126, a 4 bit tri-block sync binary sequence generator 128 and a 4 bit secondary channel data input from the data terminal equipment. This composite signal of 852 bits is fed through train mode/data mode signal selector 132 to PAM encoder 134 where it is encoded serially, two bits at a time, to produce a four-level pulse amplitude modulated signal at a baud-rate of 2552 Hz. These analog signals are then modulated with a carrier frequency by modulator 136 and passed through 1000 to 2700 Hz band-pass filter 138 to voltage adder 140. When in the full-duplex configuration the signal is combined with LST signal and fed to driver and power level set 142. The signal is coupled across the transformer 144 and transmitted through T/R relay 16 and first terminal means 18 to transmission lines and thence to a remote DTS.

The LSR 196 receives low speed reverse channel signals from a remote DTS through T/R relay 16. The signal is filtered through 300 to 600 Hz band-pass filter 146 to automatic gain controlled amplifier 148. The output of amplifier 148 is fed to synchronous demodulator 150, baud-rate recovery circuits and phase-lock loop 152 (BRR/PLL) and square law detector 154 simultaneously. A D.C. level and a twice carrier frequency component is fed from detector 154 to amplifier 148 to control the gain and to carrier recovery phase-lock loop (CR/PLL) 156 which after receiving carrier signal feeds synchronous demodulator 150 to demodulate the data signal. The demodulated signal from demodulator 150 and baud-rate from BRR/PLL 152 feed reset integrator filter 158 where the voltage of each binary symbol is integrated. This integrated voltage is fed serially to binary detector and DPSK differential phase-shift keyed modulation decoder 160 and acceptance band comparator 168. The output of decoder 160 consists of binary serial data and is fed to ACK/NAK word detector and synchronizer 164 and demultiplexor 166. In detector 164, the sequence of binary data or polarity pattern is compared against a predetermined polarity pattern. A shift register within word detector 164 is sampled at a predetermined time to generate the ACK/NAK decision bit which is fed to OK/RQ logic 170.

Comparator 168 compares the absolute integrated voltage of each binary symbol fed from integrator 158 against a predetermined acceptance band voltage. To accomplish this, comparator 168 may comprise a full wave rectifier coupled to an upper and lower comparator which are in turn coupled to an AND gate to generate an accepted/not accepted output signal or bit. The accepted/not accepted output bit of comparator 168 feeds OK/RQ logic circuitry 170. If the voltages of each binary symbol are within the limits of the acceptance band and ACK is received from detector 164 for the corresponding symbols, then an OK control signal is generated by OK/RQ logic circuitry 170 and fed through switch 172 to address counter 112 which advances the data address by an increment of one. Simultaneously the OK control signal is passed to data clock enable gates 174 to signal the data terminal equipment for new data, to "new" block or recirculated logic circuitry 122 to shift in a "new" data block and to "new" or repeated data block switch 120 to accept "new" data from multiplexor 118. In addition, the Ok control signal is fed to clear-to-send latch 161 which signals the data terminal equimpent via interface 10. The presence of an OK control signal and a ready-to-receive signal from the remote DTS indicated that the remote system is ready to receive new data. If the voltage of any binary symbol is not within predetermined limits or an NAK decision bit is present, an RQ control signal is generated and is fed through switch 172, to address counter 112 which does not advance, to gates 174 which are not actuated, to circuitry 122 causing 2 block shift register memory 123 to shift out of the two data memory to switch 120 where the previous two data blocks from the buffer 123 are retransmitted.

At the same time the ACK/NAK word is fed to circuitry 170, block sync is fed to bit counter 162 where it is combined with the output of BRR/PLL 152. Timing from bit counter 162 feeds demulti-plexor 166 along with decoder 160 where secondary data, remote call bit and request-to-receive signals are demultiplexed and fed to interface 10, lamp 167 and OK/RQ logic circuitry 170 and throughput calculator 176 respectively.

Throughput calculator 176 which receives signals from OK/RQ logic circuitry 170 and request-to-receive signal from demultiplexor 166 calculates the average percentage of data blocks delivered error-free to the remote DTS. Throughput meter 178 provides a visual indication of throughput performance.

The DTS includes both a manual and automatic train capacity for modern synchronization. The training mode may be initiated by turning power on or manually by a push button which energizes training mode timer 184. Timer 184 synchronizes equalizer code generator 186 and training code sync generator 188, and causes signal selector 132 to enter the training mode. The output of sync generator 188, a two level PAM pattern 502, and code generator 186, a four level PAM pattern 503, are fed to selector 132 where the signals are multiplexed. The training code is transmitted comprising a tone echo suppressor signal 501, the two level pattern signal 502 and the four level known pattern signal 503. This code is transmitted before the data mode 504. Tone echo suppressor signal disables echo suppressors that are commonly found upon dial up-voice grade circuits. The two level PAM patterm 502 synchronizes the Baud Rate Phase-Lock Loop 208, the carrier frequency phase-lock loop 297 and the randomizer code generator 218. The pattern 502 also provides initial synchronization to Equalizer 215. After this initial synchronization acquired from the two level pattern 502, the four level known pattern 503 provides further equalizer training. The output of sync generator 188, a predetermined binary sequence, and code generator 186, a four level PAM training code, are fed to selector 132 where the signals are multi-plexed. During the training cycle an echo suppressor tone disables the echo suppressors. By the time the HST enters the data mode, the LSR 106 is ready to clock the OK/RQ signals to ARQ logic circuitry and secondary channel low speed data to interface 10. In order to provide an automatic retaining command, limit detectors 180 fed from throughput calculator 176 sense and compare throughput performance. Limit detector 180 may comprise an operational amplifier to compare the throughput performance, voltage proportional to the number of acknowledged blocks to the total blocks transmitted, to a predetermined minimum voltage or performance level. When performance falls below a predetermined level, an automatic retrain command is generated within detectors 180 which signals the train mode timer 184 to enter the training mode. Poor circuit indicator 182 illuminates when throughput performance falls below a predetermined level.

In addition, a synthetic error and delay test logic circuit 190 is provided as a means of testing the round trip delay. The ARQ test button 133, when depressed, synthetically generates an error in one of the overhead bits through modulo 2 adder 127 which is used to determine whether round trip delay is within design values. If the NAK message generated by the insertion of a synthetic error is not received, or if receipt is delayed to exceed the transmission time of the succeeding block, lamp 131 will illuminate. Since errorfree transmission cannot be guaranteed, the line should be redialed to attempt to reduce transmission delay.

An important feature of the system is the block and tri-block synchronization. Block sync binary sequence generator 126, in addition to providing self-synchronization bits to multiplexor 130, feeds tri-block state detector 121 where it is paired with tri-block sync from generator 128 to produce a tri-sync periodic reset pulse to reset code generator 124, selector 121 comprises an AND gate to generate a reset signal as described. In addition, this block sync signal is available for use external to the basic DTS.

The full-duplex/half-duplex and transmit/receive logic circuits 192 and full-duplex/half-duplex control switch 193 combine to effect the proper links in T/R relay 16 discussed more fully hereinafter.

Figure 3:
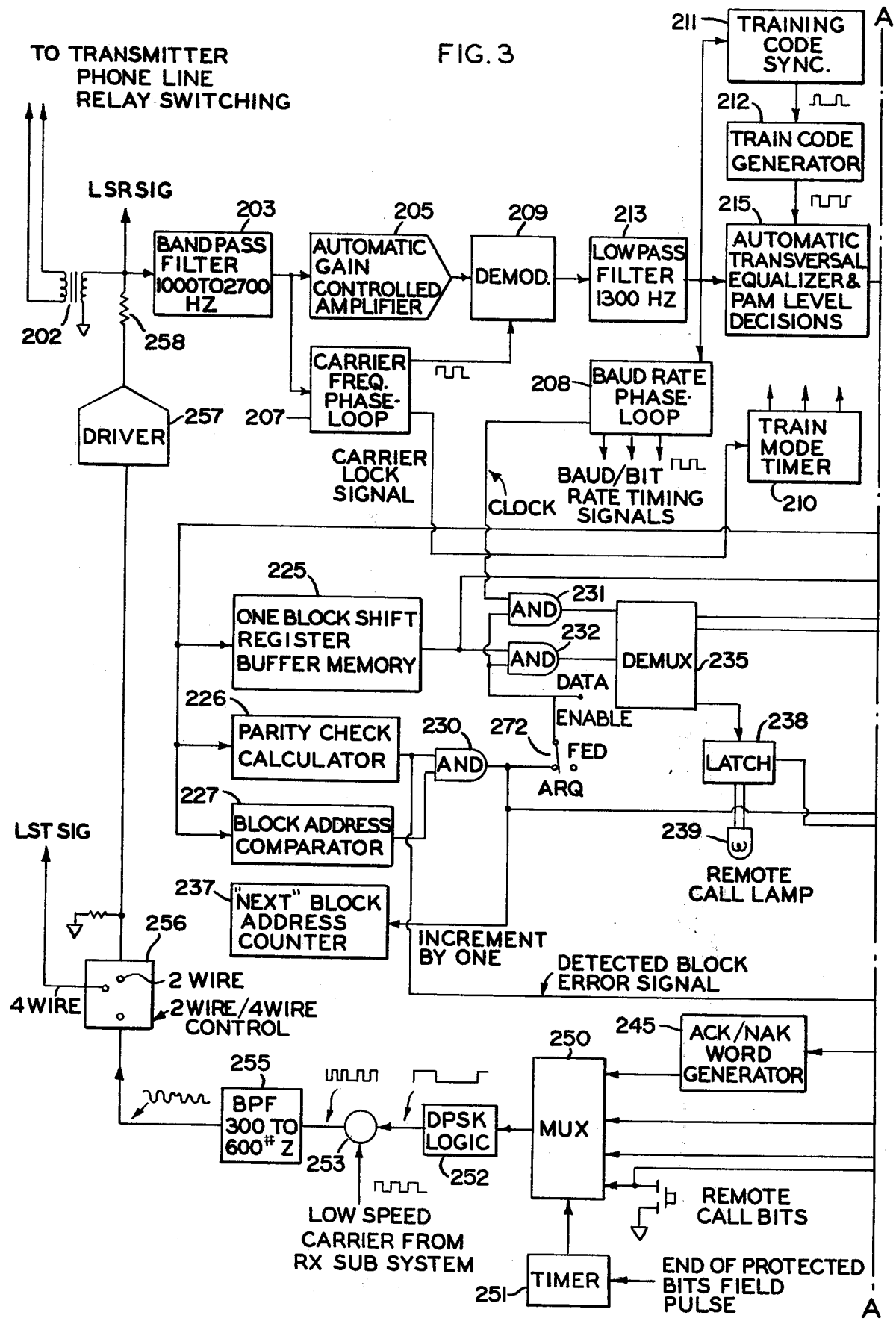
FIGS. 3 and 3A show a block diagram of the high speed data receiving section.
Figure 3A:
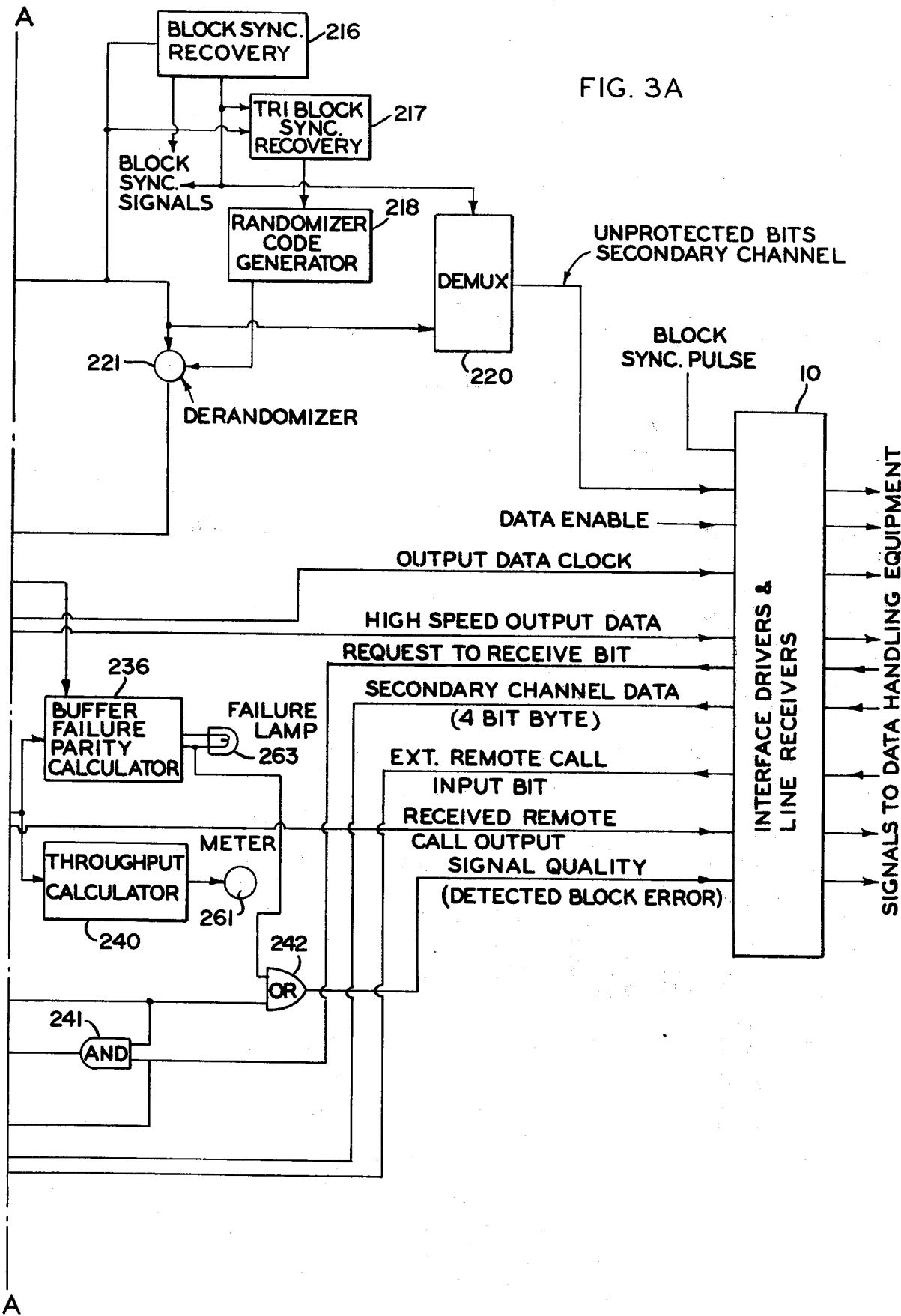

FIG. 3 shows in detail the high speed data receiving section 200. Incoming high speed data signals received through T/R relay 16 are coupled across transformer 201. The high speed data signal filtered through 1000 to 2700 Hz band-pass filter 203 to automatic gain control amplifier 205 and carrier frequency phase lock-loop (CFPLL) 207. Carrier frequency is fed from CFPLL 207 to training mode timer 210 and demodulator 209. The demodulated data signal is fed from demodulator 209 through low pass 1300 Hz filter 213 to training code synchronizer 211, automatic transversal equilizer and PAM level decision circuitry 215 and baud-rate phase lock-loop (BRPLL) 208. The equalizer compensates for amplitude and phase shift experience during transmission in order that the PAM level of the incoming data signals may be interpreted. The equalizer code is initially trained by a two level fixed pattern 502, followed by further training with a four level fixed pattern 503. The effect of the equalizer is to widen the usuable bandwidth of the circuits and consequently to permit a higher signaling rate. The equalizer keeps pulse distortion within reasonable limits by modifying the received data pulses by phase and attenuation characteristics equal to the differences between the desired and actual one. More specifically, a transversal equalizer compensates for distortion by a series of top multipliers. The equalizer is automatic in the sense that, as explained on page 17, an automatic retrain command is generated when throughput performance falls below a predetermined level. Output of the equalizer consists of distortion compensated serial data. BRPLL 208 generates baud/bit rate timing signals. The output of circuitry 215 is fed to block synchronizer recovery 216, tri-block synchronizer recovery 217, demultiplexor 220 and derandomizer 221. Block sync is fed from block synchronizer recovery 216 to tri-block synchronizer 217 which may comprise an AND gate and shift register to sample for the tri-block sync code and generate tri block sync and demultiplexor 220 which demultiplexes the unprotected secondary channel bits that are fed to interface 10. Tri-block sync is fed from tri-block synchronizer recovery 217 to randomizer code generator 218 which is fed directly to derandomizer 221 where incoming data blocks of 852 bits are derandomized and fed to block shift register buffer memory 225, parity check calculator 226 and block address comparator 227 simultaneously as with the other randomizer code generators of this device, randomizer code generators 218 comprise a shift register feed-back pseudonoise generator. The pseudonoise generator is capable of generating over a period of time randon data consisting of an equal number of 1's and 0's.

Parity check calculator 226 and block address comparator 227 feed "AND" gate 230. When in the ARQ mode, when parity checks and the address has not been previously clocked, "AND" gate 230 will energize data enable signal to interface 10. In addition, the output of gate 230 is fed to gates 231 and 232 where it is combined with memory 225 and clock respectively which in turn feed to demulti-plexor 235. At the same time the output of memory 225 is fed directly to buffer failure parity calculator 236 where the buffer memory is checked. In addition, the output of gate 230 is fed to "next" block address counter 237 which increases incrementally by one, the block-address-comparator 227, buffer failure parity calculator 236 and throughput calculator 240 parity calculator. Throughput calculator 240 comprises a simple RC network which generates voltage proportional to the ratio of the errorless blocks received to the total number of blocks received. The output of demultiplexor 235 is also fed to latch 238 which control remote call lamp 239, and to receive remote-call output of interface 10. The ACK/NAK output of parity check calculator 226 is fed to "and" gate 241 where it is combined with "request to receive" bit from interface 10 and "or" gate 242 where it is combined with the output of parity calculator 236. The output of gate 241 is fed to ACK/NAK work generator 245 while the output of gate 242 of parity check calculator 226 is fed to interface 10 as signal quality. Failure lamp 263 and throughput calculator meter 261 provide visual indication of buffer memory failure and data throughput performance respectively. The output of ACK/NAK word generator 245 is fed to multiplexor 250 along with request-to-receive bit, secondary channel data and external remote control input bit or remote call bit. Timer 251 provides a "go" pulse at the end of the protected bit field pulse to feed the low speed reverse signal to DPSK logic circuitry 252 where it is encoded and modulated with the low speed carrier by adder 253. The modulated signal is fed through bandpass filter 255 to control switch 256. In the half-duplex configuration the signal is fed through driver 257 and resistor 258 across transformer 201 to terminal 18. In the full-duplex configuration the signal is fed through switch 256 directly to voltage adder 140 for transmission through terminals 18.

Another important feature is the versatility of the half-duplex/full-duplex configurations. Relays 15, 16, 17 and 256 comprises the relay means controlled by switching means 193 which determine the signal paths in the half-duplex and full-duplex configurations.

When fourth switching means 193 is in the half duplex or second position, the request-to-send signal is fed through logic circuitry 192 to T/R relay 16. In half-duplex, high speed data is routed through transformer 144, T/R relay 16 and terminal means 18 to a receiving DTS where the high speed data is routed through first terminal means 18, relay 17 to transformer 201. Low speed reverse channel data passes from LST through relay 256, transformer 201 relays 17 and 16 to T/R relay 18. After passing through transformer 144 incoming low speed data is fed to filter 146 through relay 15.

In full-duplex configuration the high speed data from transmitter follows the same path. However, incoming data is routed through second terminal means 20, relay 17 and transformer 201. LSR signal is then routed through relay 15 to filter 146. LST signal passes from LST through relay 256, adder 140 and ultimately to T/R relay 16 and first terminal means 18.

The tri-block sync in combination with the randomize code of 1023 bits provides a unique means of encoding the data signals with a different randomizing code pattern. This minimizes the probability of transmission error occurring on a repeated data block. The tri-sync reset pulse recycles the pattern every third data block.

To provide a DTS with a capability of parallel to serial conversion which permits transfer of information between the DET and DTS an alternative embodiment a parallel interface extender (PIX) has been invented.

Figure 4:
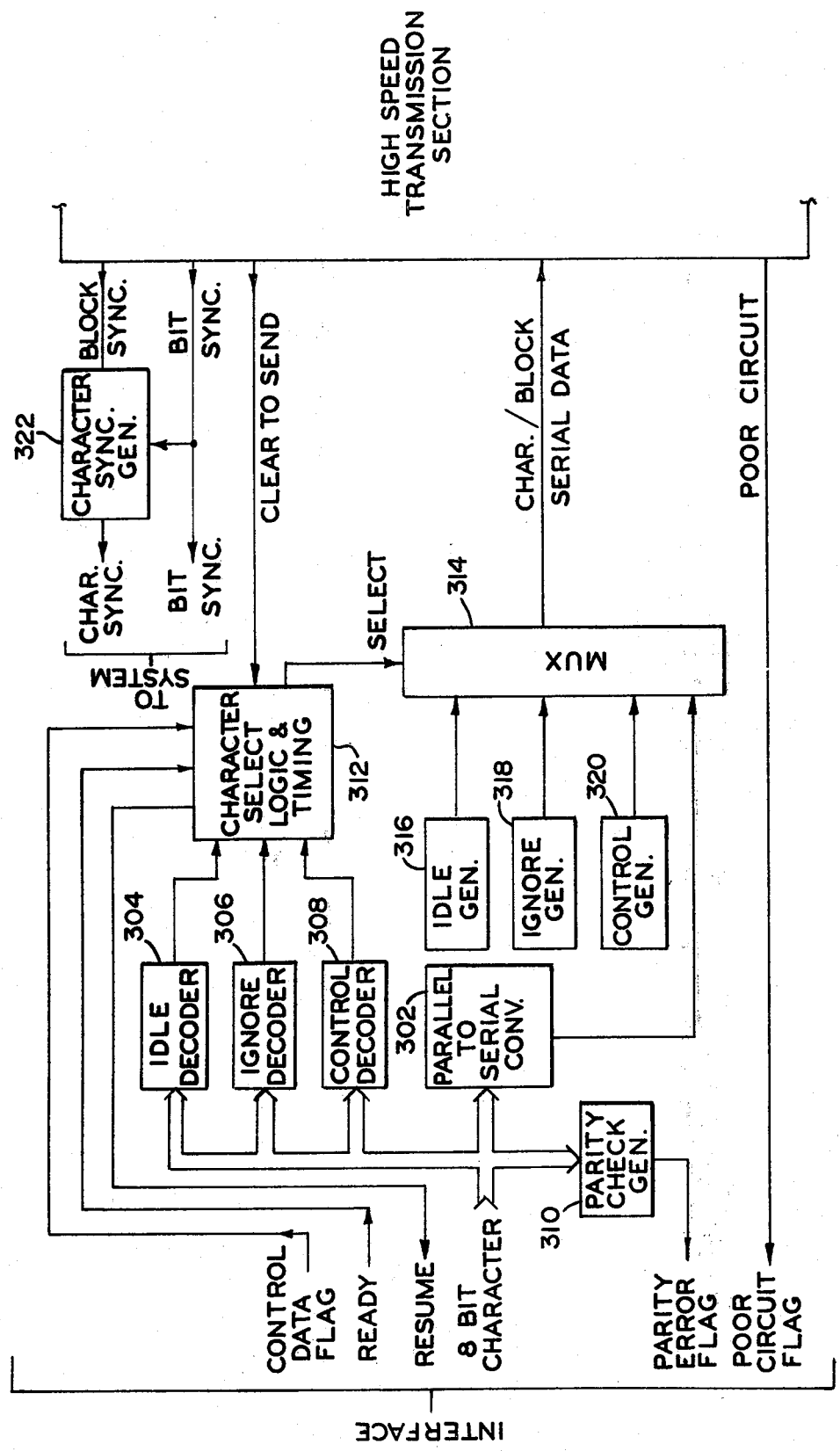
FIG. 4 is a block diagram of the parallel interface extender of the high speed data transmission section.

As seen in FIG. 4, data and control information is transferred between DTE (data interface) and the PIX transmitter through parallel channels. This information, comprising an 8 bit chharacter, is fed simultaneously to parallel to serial conversion circuitry 302, to idle character decoder 304, to ignore character decoder 306, to control character decoder 308 and parity check generator 310. Character select logic and timing circuitry 312 receives control/data flag and ready signals from local DTE, and clear-to-send signal from the DTS circuitry 312 comprises a gate network to generate a select signal upon receipt of signals of decoders 304, 306 or 308. In addition, the various "presence" bits from decoders 304, 306, and 308 are fed to circuitry 312. Multiplexor 314 multiplexes the serial data from circuitry 302 along with either idle character, ignore character control character from generators 316, 318, or 320 resepctively. This 100 character/block serial multiplexed data is then fed directly to the basic DTS 10 for transmission over the communications network. Character sync generator 322 is fed from the basic DTS and provides character and bit synchronization.

Figure 5:
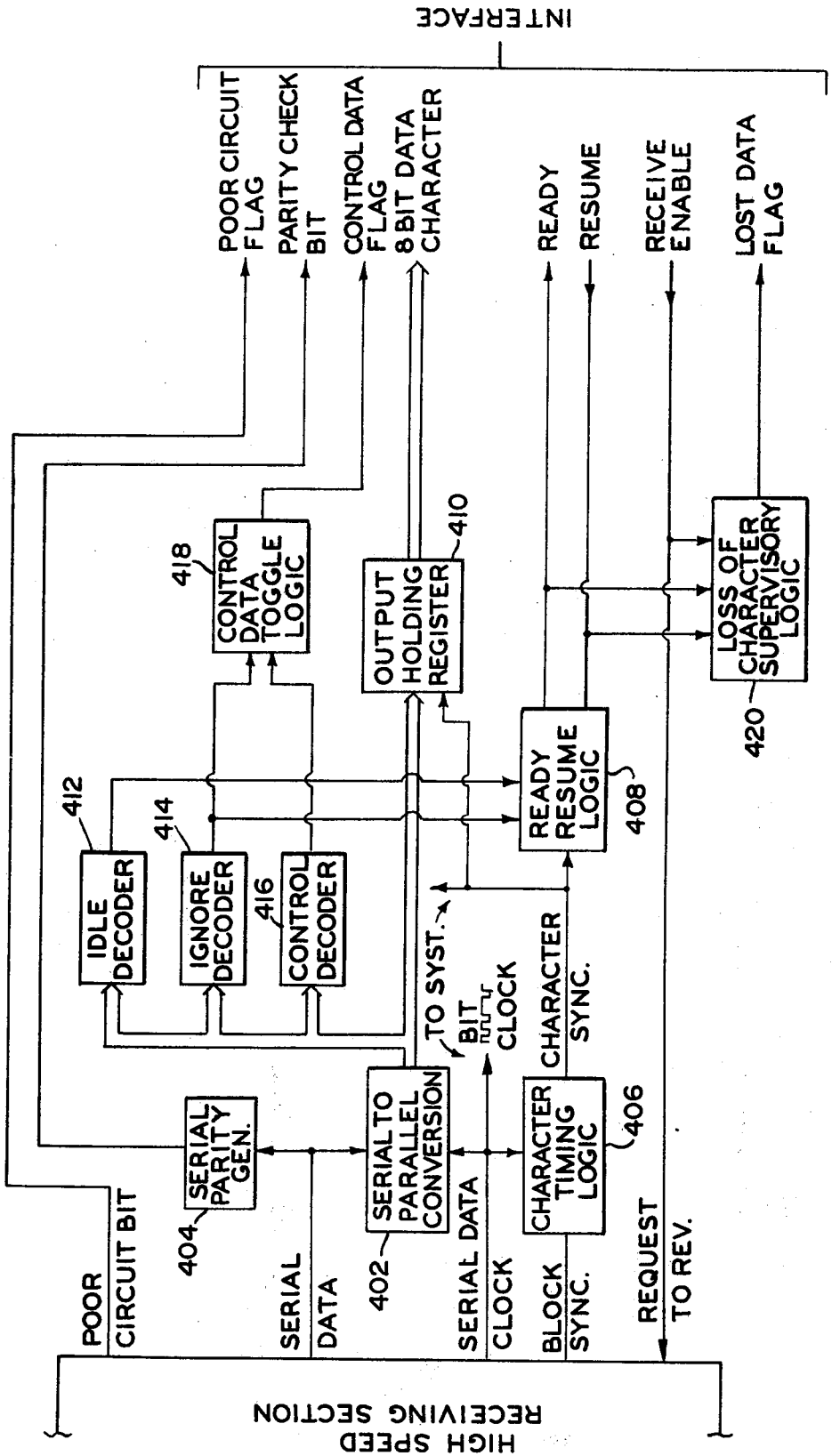
FIG. 5 is a block diagram of the parallel interface extender of the high speed data receiving section.

FIG. 5 shows the PIX receiver. Serial to parallel conversion circuitry 402 and serial parity generator 404 receive incoming signals from a remote PIX. Serial data clock feeds circuitry 402 and character timing logic circuitry 406 where character sync is generated and is fed to the ready/resume logic circuitry 408. The parallel converted data from circuitry 402 is fed simultaneously to output holding register 410, idle decoder 412, ignore decoder 414 and control decoder 416. The output of idle decoder 412 is combined with the ignore decoder 414 by ready/resume logic circuitry 408. The output of ignore character decoder 414 and control character decoder 416 are fed simultaneously to control/data toggle logic circuitry 418 which output is fed as a control/flag signal to the DTE (data interface). A ready and resume signal (described hereinafter) is combined with the receive enable signal by the loss of character supervisory logic circuitry 420 which provides an indication in the event any data is transferred and not clocked to the user circuitry 420 comprises a network of flip-flops and AND gates to determine the proper sequence of ready and resume signals from the system and data receiving equipment respectively.

Timing for the entire system is provided by crystal oscillator 30 which feeds binary frequency divider chain 32. The various timing signals, baud and carrier frequencies from divider chain 32 are fed to the various system components.

To operate, a local and remote data telecommunications system are linked together over appropriate transmission lines.

Initially the transmission section 100 enters a training cycle in response to a request-to-send signal from the DTE to establish the communications links prior to data transmission. During the training interval, the transmission section 100 sends an echo tone suppressor and various receiver equalizer training signals. By the time the transmission section 100 enters the data mode, the LSR 203 is ready to route the ACK/NAK signals to the ARQ logic circuitry 202 and the low-speed data to interface 10.

Signals on data set ready circuit from the DTS are used to indicate the status of the local DTS. This circuit is used only to indicate the status of the local system. The ON condition shall not be interpreted as either an indication that a communication channel has been established to a remote DTS or the status of any remote station equipment.

The ON condition of a clear-to-send signal from the DTS together with the ON condition of request-to-send signal and data set ready signal is an indication to the DTE that signals presented on transmitted data circuit will be transmitted to the distant system or stored in the local buffer. The OFF condition is an indication to the DTE that it should not transfer data across interface 10.

Signals to the DTS on data terminal ready circuit are used to control switching of the system to the communications channel. The ON condition prepares the system to be connected to the communication channel and maintains the connection established by external means e.g., manual call origination, manual answering or automatic call origination.

The clear-to-send signal will be generated only when a request-to-receive signal is received from the remote DTS. Clear-to-send latch 161 is reset by the training mode signal. The ON condition on request-to-receive circuit conditions the system to transmit the next available error-free 800-bit block of data to the data terminal equipment of the receiving DTS. No data is lost if the DTS is conditioned not to output a block. The DTS simply requests retransmissions from the transmitting DTS of the data is stored in the transmitter buffer 123. If the circuit is turned OFF in the middle of the block the receiving DTS will output that block but not the following blocks.

When the four signals are "ON" the transmission section 100 enters the data mode. Data signals are closed in 800-bits bursts at 5112 Hz from the DTE through interface circutis 10 to the high speed data transmission section 100 for transmission to the remote DTS.

Signals are generated at the receiving DTS in response to the data signals.

If the data is error-free and has not been previously delivered, it is clocked to the user through the interface circuits 10 and an acknowledged ACK message is returned via the low speed reverse channel to the transmitting DTS. Timing on output data clock is provided only when the HSR 200 has successfully decoded an errorfree block, since no data containing an error will be delivered to the data terminal equipment. A buffer error condition is an exception. A buffer-error will be indicated to the DTE as detected-block error. If a transmission error is detected, HST 200 requests by a NAK message a repeat from the transmission section 100 to transmit the previous two blocks rather than new data. Since the ACK/NAK messages are transmitted simultaneously with data on the forward channel, there is not interruption of data flow unless an error is received. The transmitter must receive a positive ACK message from the receiver to request new data from the data source.

As previously described, built-in throughput calculators 176 and 240 calculate the average percentage of blocks that are delivered error-free to the remote HSR in either the ARQ or FED modes. The resultant line quality is presented on throughput meters 178 and 261 and also on poor circuit indicator 182.

The poor circuit indicator 182 constantly monitor the data throughput of the communication system. The indicators illuminate when the throughput drops below an average of 60%. The indicators do not affect data throughput rates, but they do indicate to the operator that the communication lines is of questionable quality and cannot sustain the throughput capability of the DTS. The throughput meters indicate approximately the ratio of error-free data blocks to total blocks delivered to the receiver.

If the circuit quality degrades below a predetermined value the system will automatically go into auto-retrain cycle.

When the mode switches 172 and 272 are in forward-error detect (FED), the ARQ logic is forced to send all data without repetitions. Thus the FED modes will not give error-free data transmission, but each block of the data containing an error will be identified through detected block error signal quality. Meters 178 and 261 and poor circuit indicators 182 still function normally since the throughput calculators 176 and 240 continue to calculate the ratio of error-free blocks to total blocks delivered to the receiving DTS.

The design goals of this system were for not less than a 400 bps effective bit rate with a random $10^4$ bit error probability in the forward channel. Since the overhead bits are generated within the DTS and a 5112 line rate (4800-bps of data throughput and 312-bps of overhead bits as described on page 14) is used, it it possible to realize a data transmission rate of 4800 bps in the absence of errors. To achieve this, 25 error detection check bits are used in the forward direction while an effective 24 bits are used in the reverse direction.

As previously discussed, the error control and buffering system in the DTS uses a continuous transmission "GO BACK TWO" ARQ algorithm, which maximizes data throughput. Continuous transmission is made possible by the low speed reverse channel which is frequency-multiplexed onto the same circuit with the forward channel. ACK/NAK messages are transmitted on this channel simultaneously with data transmission of the high speed forward data channel.

Transmission of the second block starts immediately after transmission of the first block, without waiting for acknowledgement. During the time it takes to transmit the second block the acknowledgement for the first block is received. If the second block is received correctly, a third block is transmitted immediately after the second block. If not, both the first and second blocks are retransmitted. Thus, the "Stop-and Wait" acknowledgment turn around time is eliminated. This "GO BACK TWO" ARQ algorithm requires that there be no excessive round trip delay as previously discussed.

It is important to note that line hits, dropouts, disconnects, operator interruption and other failure modes which result in lost bits to the receive do not affect the data integrity. All data is buffered at the transmitter until a positive acknowledgement is received back from the receiving DTS. The DTS includes a 25 bps full-duplex secondary data channel in the half-duplex configuration which is operational only when the main channels are in the data mode. The secondary channel data is not, however, guarded by the primary channel error-detection circuitry. If errors are made in transmission, these errors will appear at the output.

If a transmission error is detected in the main channel with the data set in the ARQ and a repeat is called for in the main channel, it does not affect the data flow in the secondary channels.

In the forward direction the secondary channel transmitted data is time-division multiplexed with the high speed data after the latter has been buffered and encoded. Signals presented on secondary cahnnel are transmitted to the remote system at the bit rate supplied by the system high speed data clock in blocks of four bits, six blocks per second, speed data blocks. These signals are transmitted simultaneously by the HST and constitute the upper and principal component of the energy spectrum applied to the communications link.

At the same time, at the remote site, the secondary reverse channel data is time-division multiplexed with the ACK/NAK message and transmitted by the LST. Signals presented on secondary transmitted data circuit will be transmitted to the remote system at the bit rate supplied by the system low speed data clock at 106.5 bps in blocks of four bits, six blocks each second. The output power spectrum of the LST occupies the lower part of the total spectrum.

At the receiving end bandpass filters are used to isolate the appropriate spectrums so that the output of the high-speed transmission section 100 does not appear at the input to the low speed receiver 106, and vice versa. After the receivers have demodulated their signals the secondary channels are demultiplexed form the appropriate data streams and appear at the appropriate outputs.

In operation the PIX receives a "ready" signal from the DTE which is fed to logic and timing circuitry 312. Upon the Clear-to-Send signal returning, PIX timing circuitry 312 generates a "resume" signal. Upon receipt of this resume the DTE clocks an 8 bit character through interface 10 to parallel to serial conversion circuitry 302 where it is converted to serial data and fed to multiplexor 314. Decoders 304, 306 and 308 determine the presence of specific characters and provide appropriate signals to logic and timing circuitry 312 which in combination with the control/data signal from DTE selects the proper characters from multiplexor 314. These characters include an idle character, ignore character and control character. The idle character is a character sent to the receiving DTS to indicate lack of available information from transmitting DTS. The ignore character forces the remote DTS to ignore the character immediately following it and unconditionally deliver it to the output. This is necessary in the event the data fed from the local DTE corresponds exactly with that of the idle character. The control character is provided to indicate a change of state from control to data or data to control for interpretation of the 8 bit. These three characters are generated by idle generator, ignore generator 318, and control generator 320 respectively. Multiplexor 314 multiplexes data from circuitry 302 and appropriate special character generator selected by logic and timing circuitry 312. This 100 character/block serial data is fed to the high speed transmission section 100 for transmission over the communications network. It is important to note that the entire system will not function without the ready/resume signals. This control in combination with the error-free data integrity of the DTS provides for a complete system wherein the transmitting PIX appears to a remote terminal as an extension of a standard parallel I/O channel.

Since block sync and PIX clock information is available from the basic DTS, there is no additional requirement for synchronization and no block length restriction. In addition due to this positive action control there is no requirement for internal time out periods.

The receiving PIX feeds incoming serial data to serial to parallel conversion circuitry 402 and serial parity generator 404. Parallel data is fed to output holding register where it is made available through interface 10 to the DTE. This parallel information from 402 is also fed simultaneously to idle decoder 412, ignore decoder 414, and control decoder 416 where the data is checked for presence of the special characters. If the data is a valid control/data character, toggle logic 418 will signal the DTE. (data interface. As with the transmitting PIX a ready/resume control response is essential. Ready/resume logic circuitry 408 checks the output of decoders 412 and 414. If the control or data information is available, a "ready" signal is sent from circuitry 408 to the receiving DTE which responds with a "resume" signal.

In order to insure complete data integrity, loss of character supervisory logic circuitry 420 is provided to indicate lost data in the event data transmitted from a remote PIX has not been clocked to the receiving DTS before the receive enable signal goes down. Both the ready and resume control signals as well as the receive enable signal from DTE are fed to supervisory logic circuitry 420. At any time, one or more of these signals has an error causing condition, logic circuitry 420 will indicate "lost" data to the DTE. The receive enable signal inhibits further data transfer after up to 200 additional characters are received. In addition, the receive enable signal provides the request-to-receive signal DTS for transmission to the transmitting DTS and its data inhibit ARQ circuits.

Serial parity signals from generators 310 and 404 and poor circuit signals are fed to the transmitting and receiving PIX's respectively.

It will thus be seen that the objects set forth above among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A bi-directional data telecommunication system for continuous high speed error-free data communication over a half-duplex limited bandwidth transmission medium between a transmitting and receiving data telecommunications system comprising: a high speed forward data channel and a low speed reverse error control channel, said high speed forward data channel multi-plexed with said low speed reverse error control channel, said high speed data channel including a high speed data transmission section and a high speed data receiving section, said low speed reverse error control channel including a low speed reverse error control transmitter and low speed reverse error control receiver, said high speed data transmission section including means to generate an error detection code for each data block and means to transmit said error detection code and said data blocks to a receiving data telecommunications system, said high speed receiving section including means to decode said error detection code and said data blocks, said high speed receiver section including means to generate an error control signal for each said data block received, said error control signal comprising a first signal for each error-free data block received and a second signal for each data block received having an error detected said high speed receiving section being coupled to said low speed reverse error control transmitter to feed said error control signal from said high speed receiving section to said low speed reverse error control transmitter, said low speed reverse error control transmitter including means to transmit a reverse channel signal, said reverse channel signal comprising an acknowledgment signal when said first signal is received and a negative acknowlegment when said second signal is received, said low speed reverse error control receiver including means to detect said reverse channel signals, said low speed reverse error control receiver including means to generate a data transmit signal in response to said reverse channel signals, said data transmit signal comprising a new data signal when said acknowledgment is received and a retransmit data signal when said negative acknowledgment signal is received, said high speed transmission section further including buffer means to buffer at least two transmitted data blocks until receipt of said reverse channel signal corresponding to the first of said data blocks from said low speed reverse channel transmitter from the receiving site, said high speed transmission section coupled to said low speed reverse error control receiver to receive said data transmit signals, said high speed transmitter including means to transmit new data from said data terminal equipment when said acknowledgment message is received and retransmit buffered data when said negative acknowledgment message for continuous high speed forward data channel signaling, said acknowledgment message comprises a plurality of binary symbols of a predetermined absolute voltage value and a preselected polarity pattern and wherein said negative acknowledgment message comprises any combination of binary symbols not comprising said acknowledgment message, said low speed receiver includes circuitry to determine the absolute voltage value and polarity pattern of said binary symbols, said circuitry comprises an automatic gain control linear receiver to integrate the voltage of each of said incoming binary symbols, acceptance band comparator coupled to said linear receiver to receive said integrated voltage and compare the absolute value of said integrated voltage with a predetermined acceptance region, said acceptance band comparator including means to generate a first output signal when said integrated voltage is within said predetermined acceptance region and a second output signal when said integrated voltage exceeds said predetermined acceptance region, and binary detector and decoder means coupled to said linear receiver to receive said integrated voltage to detect and decode said incoming binary symbols, said binary detector and decoder mean being coupled to a reverse channel signal state detector, said reverse channel signal state detector including means to detect the polarity pattern of said binary symbols which comprise said reverse channel signal, said reverse channel signal state detector including means to generate a first output signal when said polarity pattern corresponds to a predetermined pattern and a second output signal when said polarity pattern varies from said predetermined polarity pattern, said logic circuitry including means to generate said new data signal in response to said first output signal from said acceptance band comparator and said first output signal from said reverse channel signal state detector and to generate said retransmit data signal in response to either said second output signal from said acceptance band comparator or said second output signal from said reverse channel signal state detector.

2. The data telecommunication system as in claim 1 wherein said high speed data receiving section further includes an output buffer for said incoming data blocks, said high speed data receiving section including means to clock said incoming data blocks said receiving data terminal equipment when error free data is confirmed.

3. The data telecommunications system of claim 1 wherein said system includes relay means coupling high speed forward data channel and said low speed reverse error control channel to the transmission medium, said relay means including switching means having a first and second state, said system operating in a half-duplex mode when said switching means is in said first state and said system operaging in full-duplex mode when said switching means is in said second state.

4. The data telecommunications system of claim 1 wherein said high speed data transmission section and said high speed data receiving section include a first and a second throughput calculator respectively which calculate the average percentage of data blocks delivered error-free.

5. The data telecommunication system of claim 4 wherein said first and second throughput calculators are coupled to a first and a second meter respectively whereby the average error-free data blocks is visually displayed.

6. The data telecommunications system of claim 1 wherein said high speed data transmission section further includes a secondary forward data channel and said low speed reverse channel includes a secondary reverse data channel, said secondary forward channel data being time-division multiplexed with the high speed data and said low speed secondary reverse channel data being timedivision multiplexed with ARQ signaling data whereby said data telecommunictions system includes a full-duplex low speed data link over a two wire system.

7. The data telecommunication system of claim 1 wherein said system further includes means of transferring data across parallel channels to said data telecommunication system said data telecommunication system having means to convert said parallel data to serial data for transmission, said receiving data telecommunication system having means to reconvert said parallel data channels.

8. The data telecommunication system of claim 7 including means responsive to a data telecommunication system enable signal means generated by said receiving data telecommunication system to inhibit data flow from said receiving data without loss of data integrity.

* * * * *

UNITED STATES PATENT OFFICE
CERTIFICATE OF CORRECTION

Patent No. 3,956,589            Dated May 11, 1976

Inventor(s) Luther V. Weathers et al

It is certified that error appears in the above-identified patent and that said Letters Patent are hereby corrected as shown below:

```
Column  2, line 33, change "unless" to --Unless--
Column  4, line 54 - after "data" insert --and---
Column  6, line 35 - change "pit" to --bit--
Column 11, line 13 -  change "chharacter" to --character--
```

Signed and Sealed this

Twenty-eighth   Day of   September 1976

[SEAL]

Attest:

RUTH C. MASON             C. MARSHALL DANN
*Attesting Officer*          *Commissioner of Patents and Trademarks*